US011246074B2

(12) United States Patent
Yan et al.

(10) Patent No.: US 11,246,074 B2
(45) Date of Patent: Feb. 8, 2022

(54) COMMUNICATION METHOD AND COMMUNICATIONS APPARATUS

(71) Applicant: HUAWEI TECHNOLOGIES CO., LTD., Shenzhen (CN)

(72) Inventors: Le Yan, Shanghai (CN); Yanglai Shuai, Shanghai (CN); Hongping Zhang, Shanghai (CN); Qinghai Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/910,541

(22) Filed: Jun. 24, 2020

(65) Prior Publication Data
US 2020/0322860 A1    Oct. 8, 2020

Related U.S. Application Data

(63) Continuation of application No. PCT/CN2018/124148, filed on Dec. 27, 2018.

(30) Foreign Application Priority Data

Dec. 27, 2017    (CN) .......................... 201711447186.5

(51) Int. Cl.
*H04W 76/38*    (2018.01)
*H04W 36/18*    (2009.01)
(Continued)

(52) U.S. Cl.
CPC ........... *H04W 36/18* (2013.01); *H04L 1/1642* (2013.01); *H04W 36/08* (2013.01); *H04W 76/27* (2018.02);
(Continued)

(58) Field of Classification Search
CPC combination set(s) only.
See application file for complete search history.

(56) References Cited

U.S. PATENT DOCUMENTS

| 2014/0204771 A1* | 7/2014 | Gao ...................... H04W 36/30 |
| --- | --- | --- |
| | | 370/252 |
| 2014/0341109 A1* | 11/2014 | Cartmell ................. H04L 43/50 |
| | | 370/328 |

(Continued)

FOREIGN PATENT DOCUMENTS

| CN | 101090560 A | 12/2007 |
| --- | --- | --- |
| CN | 101365248 A | 2/2009 |
| CN | 102480796 A | 5/2012 |

OTHER PUBLICATIONS

Ericsson (0ms support during handover procedure in NR, 3GPP #98, R2-1704434, May 2017).*

(Continued)

*Primary Examiner* — Lakeram Jangbahadur
(74) *Attorney, Agent, or Firm* — Rimon PC

(57) ABSTRACT

Embodiments of this application disclose a communication method and a communications apparatus. A source base station instructs a terminal to hand over from the source base station to a target base station, and sends, to the terminal, configuration information of a second connection required for communication between the terminal and the target base station. The terminal maintains a first connection for communication with the source base station, and establishes the second connection for communication with the target base station based on the configuration information of the second connection. The solutions in the embodiments of this application reduces latency in a handover process.

15 Claims, 6 Drawing Sheets

(51) Int. Cl.
    *H04W 76/27*    (2018.01)
    *H04L 1/16*     (2006.01)
    *H04W 36/08*    (2009.01)
    *H04W 80/02*    (2009.01)
    *H04W 80/08*    (2009.01)

(52) U.S. Cl.
    CPC ........... *H04W 76/38* (2018.02); *H04W 80/02* (2013.01); *H04W 80/08* (2013.01)

(56) References Cited

U.S. PATENT DOCUMENTS

| | | | |
|---|---|---|---|
| 2016/0262066 A1* | 9/2016 | Ozturk | H04W 36/08 |
| 2016/0269955 A1* | 9/2016 | Lin | H04L 47/34 |
| 2019/0349822 A1* | 11/2019 | Kim | H04W 36/08 |
| 2019/0364462 A1* | 11/2019 | Kim | H04W 36/00 |

OTHER PUBLICATIONS

Huawei (Comparison of 0ms interruption solutions, 3GPP NR#2, R2-1706707, Jun. 2017).*

Ericsson,"0 ms support during handover procedure in NR",3GPP TSG-RAN WG2 #98 Tdoc R2-1704434,Hangzhou, China, May 15, 2017,Total 6 Pages.

Huawei et al.,"Comparison of 0ms interruption solutions",3GPP TSG-RAN WG2 Ad Hoc NR #2 R2-1706707, Qingdao, China, Jun. 27, 2017,Total 8 Pages.

\* cited by examiner

COMMUNICATION METHOD AND COMMUNICATIONS APPARATUS

CROSS-REFERENCE TO RELATED APPLICATIONS

This application is a continuation of International Application No. PCT/CN2018/124148, filed on Dec. 27, 2018, which claims priority to Chinese Patent Application No. 201711447186.5, filed on Dec. 27, 2017. The disclosures of the aforementioned applications are hereby incorporated by reference in their entireties.

TECHNICAL FIELD

Embodiments of this application relate to the communications field, and in particular, to a communication method and a communications apparatus.

BACKGROUND

In a communications system, as a terminal moves around, the network hands over the terminal from a source cell to a target cell in a handover process. After sending a handover command to the terminal through an air interface, the source base station stops transmitting uplink and downlink data to the terminal and sends a sequence number (SN) status transfer message to a target base station, and forwards data packets (data forwarding) to the target base station.

Before and after the handover, for a same bearer/service, data transmission performed between the terminal or UE and the source base station is associated with data transmission performed in the target cell. Data transmission that cannot be completed between the terminal and the source base station continues to be completed by the target base station after the UE is successfully handed over to the target base station.

In the handover process, sending of the SN status transfer message and forwarding of the data packet between the source base station and the target base station cause latency. Especially, when backhaul between the base stations is not satisfactory, the latency is relatively high, and user experience of latency-sensitive services is affected.

SUMMARY

Embodiments of this application provide a communication method and a communications apparatus.

According to a first aspect, a communication method is provided. The communication method may be implemented by a terminal or a component of the terminal, and may include:

receiving, from a first network device, a first message indicating the terminal to hand over from the first network device to a second network device, where the first message includes configuration information of a second connection for communication between the terminal and the second network device;

maintaining a first connection for communication between the terminal and the first network device; and establishing the second connection for communication between the terminal and the second network device based on the configuration information of the second connection, where a packet data convergence protocol PDCP entity corresponding to the second connection and a PDCP entity corresponding to the first connection are a same PDCP entity or different PDCP entities.

According to the method, SN status transfer and data packet forwarding are not performed between the first network device and the second network device, so that latency in a handover process can be reduced, and transmission efficiency can be improved.

In a possible design, when the PDCP entity corresponding to the second connection and the PDCP entity corresponding to the first connection are a same PDCP entity, the configuration information of the second connection includes physical PHY entity configuration information, media access control MAC entity configuration information, and radio link control RLC entity configuration information.

In a possible design, when the PDCP entity corresponding to the second connection and the PDCP entity corresponding to the first connection are different PDCP entities, the configuration information of the second connection includes: PHY entity configuration information, MAC entity configuration information, RLC entity configuration information, and PDCP entity configuration information.

In a possible design, when PDCP entities included in a protocol stack corresponding to the second connection and the first connection are different PDCP entities, a PDCP sequence number (SN) of a data packet transmitted on the first connection is not associated with a PDCP SN of a data packet transmitted on the second connection.

In a possible design, the first message further includes first indication information, and the first indication information indicates to the terminal to maintain the first connection after receiving the message, and maintain the first connection based on the first indication information. Flexible configuration on a network side can be implemented by using the first indication information.

In a possible design, the first message may further include a time length of a first timer, and the first timer is configured to control the moment for releasing the first connection. Alternatively, after random access to the second network device is completed, information used to instruct the terminal to release the first connection is received from the second network device, and the first connection is released based on the information. In this way, the terminal can determine when to release the first connection, release resources in time, and avoid waste of resources.

In a possible design, if data packets obtained in a data packet duplication manner are transmitted on the first connection and the second connection, the first message further includes information used to indicate the terminal to perform duplicate packet detection on the data packets on the first connection and the second connection, and the duplicate packet detection is performed on the data packets on the first connection and the second connection on the terminal. In this manner, the terminal can accurately determine when to perform the duplicate packet detection.

In a possible design, if the data packets obtained in the data packet duplication manner are transmitted on the first connection and the second connection, the terminal may determine whether the data packets are data packets obtained in the data packet duplication manner based on packet header information of the data packets.

In a possible design, if the data packets transmitted on the first connection and the second connection are not obtained in the data packet duplication manner, the duplicate packet detection is not performed on data packets that belong to different connections but have a same PDCP SN. This can avoid packet loss and improve data transmission reliability.

In a possible design, the method further includes: after successfully accessing the second network device, sending, by the terminal, indication information used to stop data packet duplication to the first network device, to avoid a waste of resources.

In a possible design, the first connection and the second connection are used to transmit data packets that belong to a same QoS flow.

In a possible design, the first message is an RRC reconfiguration message.

According to a second aspect, a communication method is provided, including:

sending, by a first network device to a terminal, a message indicating to the terminal to hand over from the first network device to a second network device, where the message includes configuration information of a second connection for communication between the terminal and the second network device, where a packet data convergence protocol PDCP entity corresponding to the second connection and a PDCP entity corresponding to the first connection are a same PDCP entity or different PDCP entities; and communicating, by the first network device, with the terminal by using the first connection, where the first network device does not perform operations of sending a sequence number status transfer message to the second network device and forwarding a data packet to the second network device.

According to a third aspect, a communication method is further provided, including: sending, by a second network device, configuration information of a second connection to a first network device, and communicating, by the second network device, with a terminal by using the second connection. In a possible design, the configuration information of the second connection may be carried in an acknowledgment message in responding to a handover request sent by the first network device.

In a possible design, the method may further include: sending, to the terminal, information used to indicate the terminal to release a first connection.

According to a fourth aspect, a communication method is provided, including:

receiving, by a core network device from a first network device, a request to perform data packet duplication; after performing the data packet duplication, separately transmitting, by the core network device, a data packet to a first connection and a second connection, where the first connection is a connection for communication between a terminal and the first network device, and the second connection is a connection for communication between the terminal and a second network device.

In a possible design, the second connection is established according to the method in the first aspect.

In a possible design, after the first network device sends a first message, the core network device receives the request sent by the first network device.

In a possible design, the method further includes: receiving, by the core network device from the first network device or the second network device, an indication for stopping the data packet duplication.

According to a fifth aspect, a communication method is further provided. The communication method may be implemented by a terminal or a component of the terminal, and may include:

receiving, by using a first connection and a second connection, data packets obtained in a data packet duplication manner, where the first connection is a connection for communication between the terminal and a first communications device, and the second connection is a connection for communication between the terminal and a second communications device.

In a possible design, the second connection is established according to the method in the first aspect.

In a possible design, the data packet obtained in the data packet duplication manner is duplicated by the core network or duplicated by the first network device.

In a possible design, the method further includes: sending an indication for stopping data packet duplication to the first network device.

In a possible design, the method further includes: receiving, from the first network device, information instructing the terminal to perform duplicate packet detection on data packets that belong to the first connection and the second connection.

In a possible design, the method further includes: determining, based on packet header information of received data packets, whether the data packets transmitted on the first connection and the second connection are data packets obtained in the data packet duplication manner.

According to a sixth aspect, a communication method is provided, including:

sending, by a first network device, a data packet to a terminal by using a first connection, where a data packet transmitted on the first connection is the same as a data packet transmitted on a second connection, the first connection is a connection for communication between the terminal and the first network device, and the second connection is a connection for communication between the terminal and a second network device.

In a possible design, the second connection is established according to the method in the first aspect.

In a possible design, the method may further include: sending, to a core network device, a request that the core network device perform data packet duplication, and receiving a data packet sent by the core network device.

In a possible design, the request may be sent to the core network device after a first message is sent to the terminal.

In a possible design, the data packet duplication may be implemented on the first network device. The data packet duplication may be performed after the first network device sends the first message or receives a second message from the second network device. The second message is a message used to acknowledge that the terminal is allowed to be handed over to the second network device, for example, may be a handover request acknowledgment message.

In a possible design, the method may further include: sending an indication for stopping the data packet duplication to the terminal; or receiving, from the terminal, an indication for stopping the data packet duplication; or sending a time length of a second timer to the terminal, where the second timer is configured to control a validity duration of a duplication mode; or sending an indication for stopping the data packet duplication to the core network device.

According to a seventh aspect, a communication method is provided, including:

sending, by a second network device, a data packet to a terminal by using a second connection, where a data packet transmitted on a first connection is the same as a data packet transmitted on a second connection, the first connection is a connection for communication between the terminal and a first network device, and the second connection is a connection for communication between the terminal and the second network device.

In a possible design, the second connection is established according to the method in the first aspect.

In a possible design, the method further includes: receiving, from a core network device or the first network device, a data packet obtained in a data packet duplication manner.

In a possible design, the method further includes: sending an indication for stopping data packet duplication to the core network device.

According to the communication methods provided in the fourth aspect to the seventh aspect, packet loss rate can be reduced and data packet transmission reliability can be improved in the data packet duplication manner.

According to an eighth aspect, a communications apparatus is provided, including a module, a component, or a circuit configured to implement the communication method in the first aspect, the second aspect, the third aspect, the fourth aspect, the fifth aspect, the sixth aspect, or the seventh aspect.

According to a ninth aspect, a communications system is provided, including any one of the foregoing communications apparatuses.

According to a tenth aspect, an embodiment of this application provides a computer storage medium. The computer storage medium stores a program, and when the program is run, a computer is enabled to perform the methods in the foregoing aspects.

According to an eleventh aspect of this application, a computer program product including an instruction is provided. When the instruction is run on a computer, the computer is enabled to perform the methods in the foregoing aspects.

DESCRIPTION OF EMBODIMENTS

Technologies described in this application may be used in various wireless communications networks, such as a code division multiple access (CDMA) network, a time division multiple access (TDMA) network, a frequency division multiple access (FDMA) network, an orthogonal frequency division multiple access (OFDMA) network, a single carrier frequency division multiple access (SC-FDMA) network, and another network. The CDMA network may implement radio technologies such as universal terrestrial radio access (UTRA) and CDMA2000. The UTRA includes wideband code division multiple address (WCDMA), the CDMA, and another variation. The TDMA network may implement radio technologies such as global system for mobile communications (GSM). The OFDMA network may implement radio technologies such as evolved UTRA (E-UTRA), ultra mobile broadband (UMB), IEEE 802.11 (Wi-Fi), IEEE 802.16 (WiMAX), and IEEE 802.20. The E-UTRA may include a plurality of versions, such as LTE, LTE-A, or the like. This application may be further applicable to a fifth-generation 5G network, a subsequent evolved network, or convergence of a plurality of networks.

Figure 1:
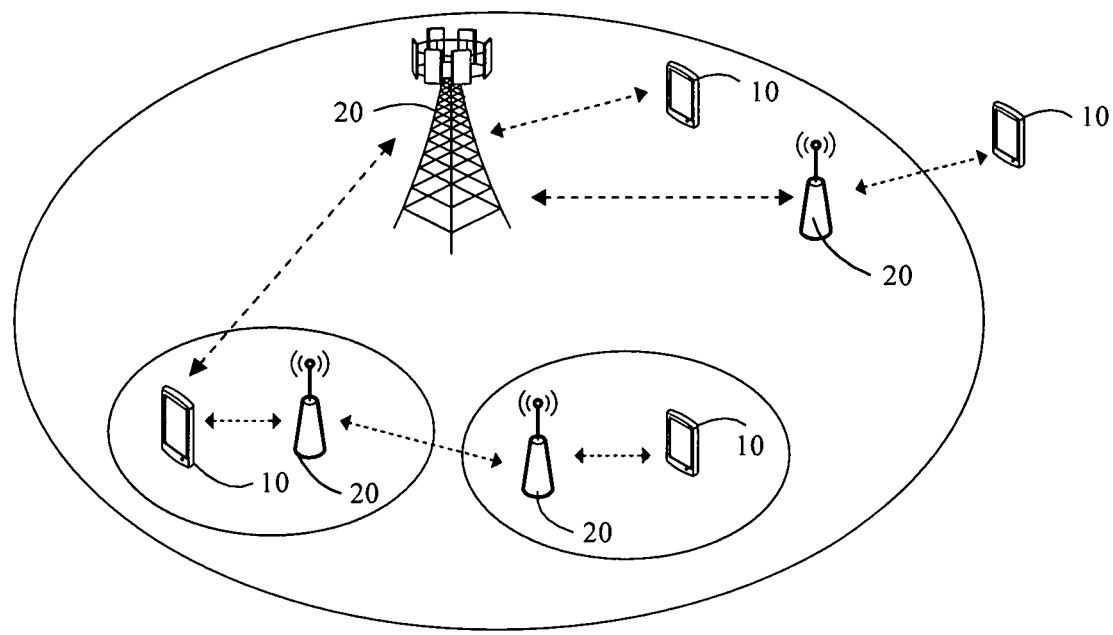
FIG. 1 is a possible schematic diagram of a radio access network according to an embodiment of this application.

FIG. 1 is a schematic diagram of a possible radio access network (RAN for short) according to an embodiment of the present invention. The RAN includes one or more network devices 20. The radio access network may be connected to a core network (CN). The network device 20 may be any device with a wireless sending/receiving function. The network device 20 includes but is not limited to a base station (for example, a BS, a NodeB, an evolved NodeB eNodeB or eNB, a base station gNodeB or gNB in a 5G communications system, a base station in a future communications system, an access node in a WiFi system, a wireless relay node, a wireless backhaul node), or the like. The base station may be a macro base station, a micro base station, a femto base station, a small cell, a relay station, or the like. A plurality of base stations can support networks using a same technology mentioned above, or may support networks using different technologies mentioned above. The base station may include one or more co-site or non-co-site transmission reception points (TRP). The network device 20 may alternatively be a radio controller, a centralized unit (CU), or a distributed unit (DU) in a cloud radio access network (CRAN) scenario. Alternatively, the network device 20 may be a server, a wearable device, a vehicle-mounted device, or the like. That the network device 20 is a base station is used as an example for description in the following. The plurality of network devices 20 may be base stations of a same type or base stations of different types. The base stations may communicate with a terminal 10, or may communicate with the terminal 10 by using a relay station. The terminal 10 may support communication with a plurality of base stations using different technologies. For example, the terminal may support communication with a base station supporting an LTE network, may support communication with a base station supporting a 5G network, or may further support a dual connection to the base station in the LTE network and the base station in the 5G network.

The terminal 10 is a device having a wireless transceiver function, and may be deployed on the land, including an indoor or outdoor device, a handheld device, a wearable device, or a vehicle-mounted device, may also be deployed on a water surface (for example, a ship), and may also be deployed in the air (for example, on an aircraft, a balloon, and a satellite). The terminal device may be a mobile phone, a tablet computer (Pad), a computer with a wireless transceiver function, a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, or the like. An application scenario is not limited in this embodiment of this application. The terminal may sometimes be referred to as user equipment (UE), an access terminal device, a UE unit, a UE station, a mobile station, a mobile console, a remote station, a remote terminal device, a mobile device, a UE terminal device, a terminal device, a wireless communications device, a UE agent, a UE apparatus, or the like. The terminal may alternatively be fixed or mobile.

Figure 2:
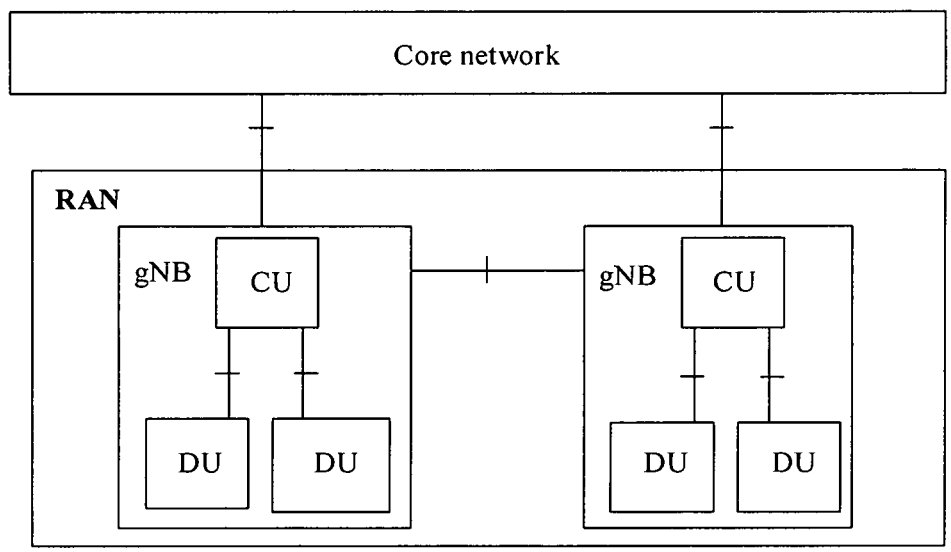
FIG. 2 is a schematic diagram of an example of an architecture of a communications system.

FIG. 2 is a schematic diagram of an example of an architecture of a communications system. As shown in FIG. 2, a network device 20 in a radio access network RAN is a base station (for example, a gNB) of a CU-DU separation architecture. The RAN may be connected to a core network (for example, an LTE core network or a 5G core network). A CU and a DU may be understood as division of a base station from a logical function perspective. The CU and the DU may be physically separated or physically deployed together. A plurality of DUs may share one CU. One DU may alternatively be connected to a plurality of CUs (not shown in the figure). The CU and the DU may be connected by using an interface, for example, an F1 interface. The CU and the DU may be divided based on a protocol layer of a wireless network. For example, a function of a packet data convergence protocol (PDCP) layer is set in the CU, and functions of a radio link control (RLC) layer, a media access control (MAC) layer, a physical layer, and the like are set in the DU. It may be understood that, that processing functions of the CU and the DU are distributed based on the protocol layers is merely an example, and the functions may alternatively be distributed in another manner. For example, functions of more protocol layers may be distributed to the CU or the DU. For example, some processing functions of protocol layers are further distributed to the CU or the DU. In a design, some functions of the RLC layer and functions of a protocol layer above the RLC layer are set on the CU, and remaining functions of the RLC layer and functions of a protocol layer below the RLC layer are set on the DU. In another design, functions of the CU or the DU may alternatively be divided based on a service type or another system requirement. For example, division is performed based on a latency. Functions whose processing time needs to meet a latency requirement are set on the DU, and functions that do not need to meet the latency requirement are set on the CU. A network architecture shown in FIG. 2 may be applied to a 5G communications system, and may alternatively share one or more components or resources with an LTE system. In another design, the CU may alternatively have one or more functions of the core network. One or more CUs may be set in a centralized manner or a separated manner. For example, the CUs may be disposed on a network side for centralized management. The DU may have a plurality of radio frequency functions, and the radio frequency functions may be remotely set.

The functions of the CU may be implemented by one entity, or may be implemented by different entities. For example, functions of the CU may be further divided. For example, a control plane (CP) and a user plane (UP) are separated. In other words, a control plane of the CU (CU-CP) and a user plane of the CU (CU-UP) are separated. For example, the CU-CP and the CU-UP may be implemented by different functional entities, and the CU-CP and the CU-UP may be coupled to the DU to jointly complete functions of the base station.

To facilitate understanding, the following describes some nouns in this application.

In this application, nouns "network" and "system" may be interchangeably used, and "apparatus" and "device" may also be interchangeably used, but meanings of the terms can be understood by a person skilled in the art. A "communications apparatus" may be the network device (for example, a base station, a DU, or a CU) or the terminal in FIG. 1 and FIG. 2, or may be a component (for example, an integrated circuit or a chip) of the network device or the terminal, or another communications module.

For ease of description, terms in an LTE system are used as examples. It may be understood that another term may also be used in another system.

An embodiment of this application provides a communication method. The method may be applied to a scenario in which a terminal is handed over from a first network device to a second network device. The first network device may be, for example, a source base station, and the second network device may be, for example, a target base station. Before the handover, the terminal communicates with the source base station within a coverage area of a source cell, and the source cell belongs to the source base station. In a handover preparation phase, the source base station interacts with the target base station. After the handover is completed, the terminal communicates with the target base station within a coverage area of a target cell.

Figure 3:
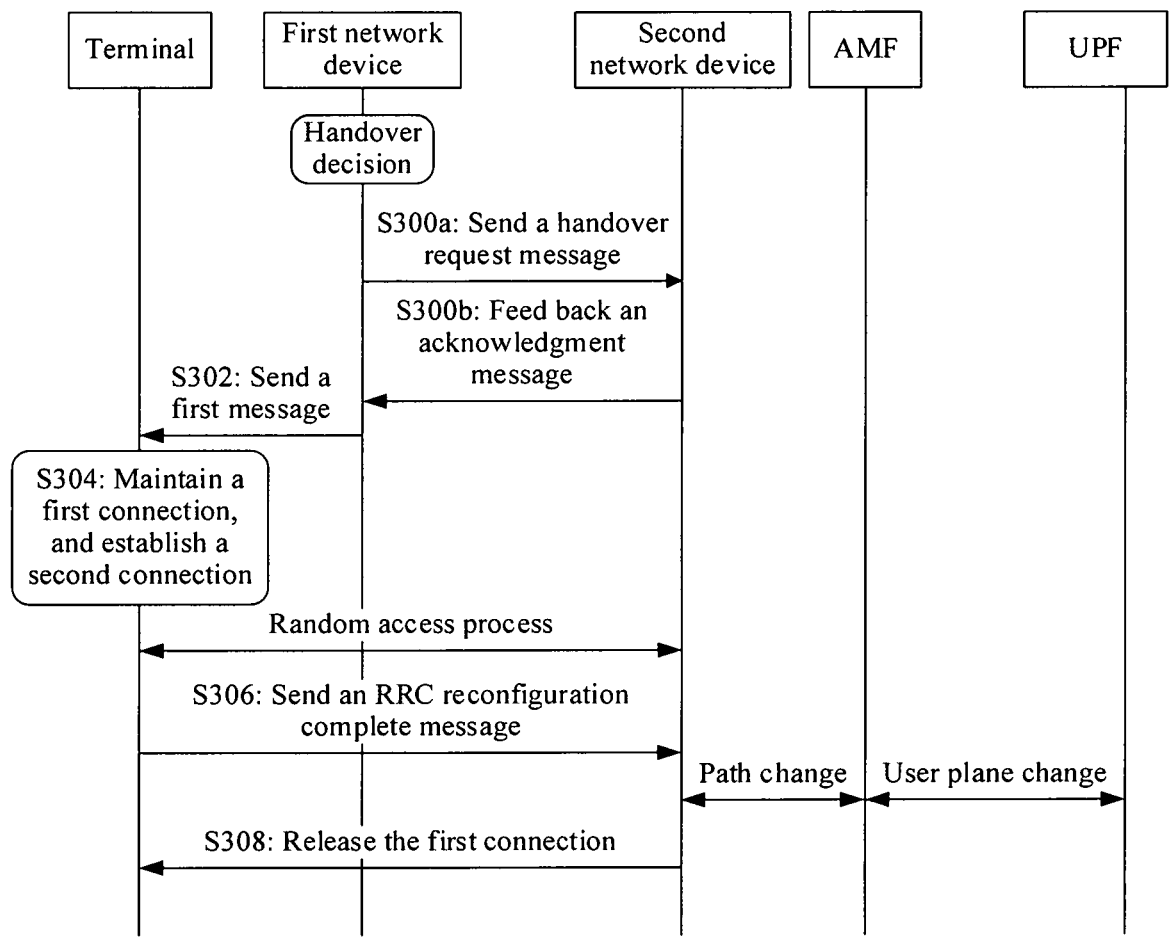
FIG. 3 is a schematic flowchart of a communication method according to an embodiment of this application.

As shown in FIG. 3, the communication method may include the following steps.

S302: The first network device sends a first message to the terminal.

A connection between the terminal and the first network device may be referred to as a first connection or a first channel.

A connection between the terminal and the second network device may be referred to as a second connection or a second channel.

Figure 4:
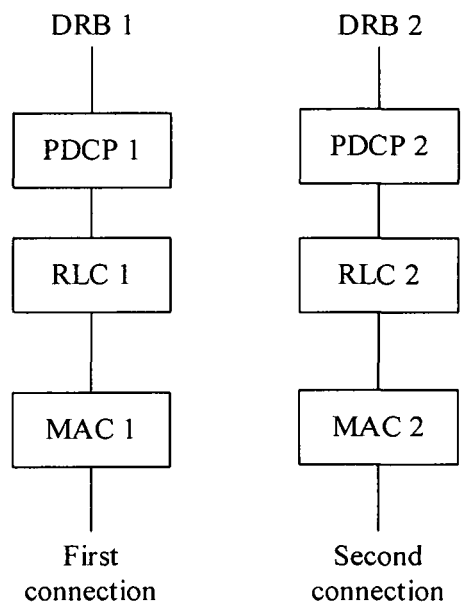
FIG. 4 is a schematic diagram of entities included in a first connection and a second connection according to an embodiment of this application.
Figure 5:
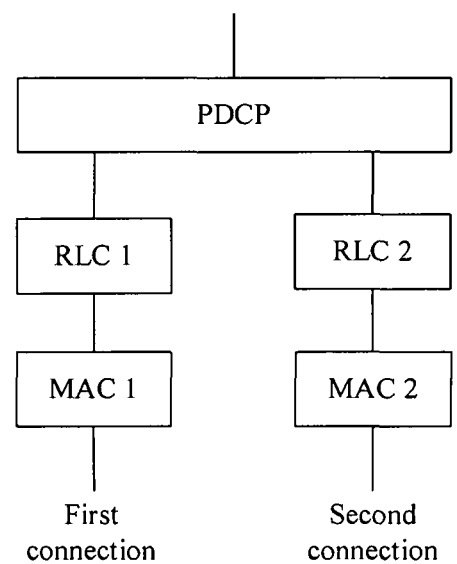
FIG. 5 is a schematic diagram of entities included in a first connection and a second connection according to an embodiment of this application.

Both the first connection and the second connection include a protocol stack, and the protocol stack includes one or more protocol layers. For example, the protocol stack includes but is not limited to a PHY entity (which may also be referred to as a PHY layer), a MAC entity (which may also be referred to as a MAC layer), an RLC entity (which may also be referred to as an RLC layer), and a packet data convergence protocol (PDCP) entity (which may also be referred to as a PDCP layer), as shown in FIG. 4 or FIG. 5. It should be noted that the protocol stack included in the first connection or the second connection may also be referred to as a protocol stack corresponding to the first connection or the second connection. The terminal has the protocol stack corresponding to the first connection and the protocol stack corresponding to the second connection, the first network device has the protocol stack corresponding to the first connection, and the second network device has the protocol stack corresponding to the second connection.

It may be understood that, for a function of each entity (protocol layer), refer to a specification of a standard protocol, for example, a description of each corresponding sublayer in 3GPP TS 38.300 V 2.0.0. In a possible manner, each entity in this embodiment of this application may also be correspondingly referred to as a sublayer. For example, the PHY entity is referred to as a PHY sublayer, the MAC entity is referred to as a MAC sublayer, the RLC entity is referred to as an RLC sublayer, and the PDCP entity is referred to as a PDCP sublayer.

In a possible implementation, a PDCP entity corresponding to the second connection and a PDCP entity (PDCP layer) corresponding to the first connection may be a same PDCP entity. For example, the first connection and the second connection share the PDCP entity (as shown in FIG. 5). Other entities (protocol layers) corresponding to the first connection and the second connection may be independent of each other (as shown in FIG. 5), or may be shared or partially shared. For the manner in FIG. 5, implementation is relatively simple, and complexity is low.

In another possible implementation, the PDCP entity corresponding to the first connection and the PDCP entity corresponding to the second connection are different PDCP entities. In other words, the PDCP entity corresponding to the first connection and the PDCP entity corresponding to the second connection are independent (as shown in FIG. 4). Other entities (protocol layers) corresponding to the first connection and the second connection may be independent of each other (as shown in FIG. 4), or may be shared or partially shared. It may be understood that the PDCP entity corresponding to the first connection and the PDCP entity corresponding to the second connection may be independent of each other. Therefore, a PDCP SN (PDCP sequence number) of a data packet transmitted on the first connection may not be associated with a PDCP SN of a data packet transmitted on the second connection. For the manner in FIG. 4, the first connection and the second connection may be decoupled.

The first network device may add configuration information of the second connection to the first message, and send the first message to the terminal. The configuration information of the second connection includes some or all information required for configuring the second connection.

For example, the configuration information of the second connection may include at least configuration information of the physical (PHY) entity, configuration information of the media access control (MAC) entity, and configuration information of the radio link control (RLC) entity. It may be understood that configuration information of each entity is some or all information required for configuring each entity. The configuration information of the entities may be different. For example, the PDCP entity may perform services such as header compression and decompression of user plane data, a security function, a handover support function, and discarding of expired user plane data. The RLC entity may perform services such as segmentation and serial connection, reordering, reassembly, retransmission, polling, and/or ensuring of reliability of a radio link. The MAC entity may perform services such as scheduling, scheduling information transfer, random access, discontinuous reception, multiplexing, and logical channel priority. The PHY entity may perform a function related to a physical layer. The configuration information of each entity may include some or all information required for providing a corresponding service of each entity.

For example, configuration information of the PDCP entity may include a length of a packet loss timer, header compression information, and/or the like. The configuration information of the RLC entity may include mode information, for example, a mode such as an acknowledged mode or a non-acknowledged mode, and corresponding configuration information of these modes. The configuration information of the MAC entity may include uplink shared channel configuration, discontinuous reception (DRX) configuration, power headroom report (PHR) configuration, and the like. The configuration information of the PHY entity may include physical downlink shared channel configuration, physical uplink control channel configuration, physical uplink shared channel configuration, uplink power control configuration, and the like. In a possible manner, for example, for the configuration information of each entity, refer to related description in 3GPP TS 38.331 V 1.0.0. It may be understood that content of the configuration information of the entity is merely described herein by using the protocol as an example. This is not limited thereto.

In a possible manner, the configuration information of the second connection may further include a data radio bearer (DRB) identifier (identifier, ID). In other words, the configuration information of the second connection may be identified by using the DRB ID.

Optionally, the configuration information of the second connection may further include configuration information of a service data adaptation protocol (SDAP) entity. The configuration information of the SDAP entity may include, for example, an identifier of a protocol data unit (PDU) session (session), SDAP header information, and the like. For example, for the configuration information of the SDAP entity, refer to related description in 3GPP TS 38.331 V 1.0.0. It may be understood that content of the configuration information of the entity is merely described herein by using the protocol as an example. This is not limited thereto.

Optionally, the configuration information of the second connection may further include a logical channel identifier and logical channel configuration information.

Optionally, the configuration information of the second connection may further include security configuration information. For example, the security configuration information may include a security key and security algorithm configuration information, and the security algorithm configuration information may include an encryption algorithm and an integrity protection algorithm.

Optionally, the configuration information of the second connection may further include configuration information about signaling radio bearer (SRB), for example, may include an SRB identifier.

In an existing solution, in uplink, an SN status transfer message is used to indicate an SN of a first lost uplink data packet and receiving statuses of uplink data packets that need to be retransmitted by a terminal in a target cell (the uplink data packets received by a source cell are out of order). A source base station forwards received out-of-order uplink data packets to a target base station. In downlink, an SN status transfer message is used to indicate a start sequence number value allocated by the target base station to downlink data packets to which no sequence number is allocated (in other words, a sequence number from which the target base station allocates a sequence number). The source base station sequentially forwards all downlink data packets that are not successfully received by the terminal to the target base station. For example, assuming that a PDCP SN of the last downlink data packet transmitted by the source base station is 10, according to an existing solution, a PDCP SN allocated by the target base station to the first downlink data packet from a core network device is 11. In this case, PDCP SNs of the source base station and the target base station are associated. However, according to the solution in this embodiment of this application, the target base station allocates a PDCP SN to the first downlink data packet from the core network device, without considering a PDCP SN of the last downlink data packet transmitted by the source base station. For example, the PDCP SN allocated by the target base station to the first new downlink data packet from the core network device may be 1 or another value.

In a possible implementation, the second network device may configure in accordance with whether the PDCP entity of the second connection is shared by the first connection.

In a possible implementation, the first network device and the second network device determine, through negotiation in a handover preparation process or before a handover, whether the PDCP entity of the first connection and the PDCP entity of the second connection are independent or shared. For example, for the terminal, if the received first message includes the configuration information of the PDCP entity, the terminal may learn that the PDCP entity of the second connection is independent of the PDCP entity of the first connection. If the received first message does not include the configuration information of the PDCP entity, the terminal may learn that the second connection and the first connection share a PDCP entity, or both the first connection and the second connection have a PDCP entity, but configuration of the PDCP entity of the second connection reuses configuration of the PDCP entity of the first connection.

For example, when the PDCP entity of the first connection and the PDCP entity of the second connection are independent of each other, the configuration information of the second connection included in the first message may be the PHY entity configuration information, the MAC entity configuration information, the RLC entity configuration information, and the PDCP entity configuration information. For another example, when the PDCP entity is shared by the first connection and the second connection, configuration information that is of the protocol stack of the second connection and that is included in the first message may be the PHY entity configuration information, the MAC entity configuration information, and the RLC entity configuration information.

In a possible implementation, for example, in the network architecture in FIG. 2, when the PDCP entity is shared by the first connection and the second connection, a PDCP entity on a network device side may be located on one CU; when the PDCP entity of the first connection and the PDCP entity of the second connection are independent, PDCP entities on the network device side are located on different CUs.

The first message is a message used to indicate to the terminal to hand over from the first network device to the second network device. In an implementation, the first network device triggers or commands, by using the first message, the terminal to hand over from the first network device to the second network device. In another implementation, the first network device implicitly indicates to the terminal to hand over from the first network device to the second network device. For example, when the first message carries the configuration information of the second connection, it indicates that the terminal should hand over from the first network device to the second network device.

In a possible implementation, the first message may be an RRC reconfiguration message. For example, the first message may be an RRC reconfiguration message carrying mobility control information, or may be an RRC message used for synchronous reconfiguration.

It may be understood that after sending the first message, the first network device may not need to perform a sequence number status sending procedure or a data forwarding procedure. In other words, the first network device does not perform operations of sending a sequence number status to the second network device and forwarding a data packet to the second network device. For example, the first network device does not perform or skips a sequence number status transfer procedure and a data forwarding procedure. It may be understood that, the first network device may send a sequence number status to the second network device by using a sequence number (SN) status transfer message, or by using another message that can implement this function. The data forwarding procedure may be implemented by using a data forwarding message, or may be implemented by using another message that can implement this function. The name of the message is not limited in this embodiment of this application, provided that a corresponding function can be implemented. For ease of description, the sequence number (SN) status transfer message and the data forwarding message are used as examples for description in this application.

Optionally, a DRB identifier corresponding to the first connection and a DRB identifier corresponding to the second connection may be the same or may be different.

Optionally, when the PDCP entity corresponding to the first connection and the PDCP entity corresponding to the second connection are different PDCP entities, in a downlink transmission scenario, a core network device (for example, a user plane function UPF) may determine how to split a quality of service (QoS) flow. Usually, a QoS flow ID may be used to identify the QoS flow. For example, the UPF splits data whose QoS flow identifier is 1 to a source base station and a target base station, and the source base station and the target base station separately implement mapping from the QoS flow to the DRB. For example, an SDAP entity of the source base station/target base station completes a function of mapping the QoS flow to the DRB. Therefore, a same QoS flow may be mapped to two same or different DRB IDs. For example, in a possible case, a same QoS flow is mapped to two same DRB IDs, to be specific, DRB configuration information of the first connection and DRB configuration information of the second connection may be identified by using a same DRB ID. In another possible case, a same QoS flow is mapped to two different DRB IDs, to be specific, the DRB configuration information of the first connection and the DRB configuration information of the second connection may be identified by using different DRB IDs. In an uplink scenario, an SDAP entity of the terminal maps a same QoS flow to two different DRBs, or an upper-layer entity of an SDAP of the terminal maps a same QoS flow to two different DRBs. The upper-layer entity may be a newly introduced entity or an existing entity located at an upper layer of the SDAP, for example, an application layer entity or others.

Optionally, when the PDCP entity of the first connection and the PDCP entity of the second connection are a same PDCP entity, the first connection and the second connection may be considered as transmitting a same DRB, but are two different logical channels for transmitting a same DRB.

S304: The terminal receives the first message, maintains the first connection, and establishes the second connection.

The terminal maintains the first connection means that the terminal maintains communication with the first network device. The terminal does not need to release the first connection, for example, does not need to reset and/or reestablish a protocol stack entity corresponding to the first connection. For another example, the terminal does not need to reset the MAC entity, and does not need to reestablish the RLC entity and the PDCP entity.

In a possible manner, it may be specified in advance (for example, agreed on by using a standard protocol or determined through negotiation in advance) that the terminal receives the first message and maintains the first connection by default. In this case, the terminal receives the first message, and performs operations of maintaining the first connection and establishing the second connection.

Herein, that the terminal establishes the second connection includes that the terminal establishes a protocol stack entity corresponding to the second connection. Correspondingly, the protocol stack entity corresponding to the second connection is also established on the second network device.

In still another possible manner, the first message may carry first indication information, and the first indication information indicates the terminal to maintain the first connection after receiving the first message. In this case, after receiving the first indication information, the terminal performs an operation of maintaining the first connection. Flexible configuration on a network side can be implemented by using the first indication information.

In yet another possible manner, the first message may also carry a time length of a first timer, and the first timer is configured to control a moment for releasing the first connection. Optionally, the terminal may start the first timer after receiving the first message, and the terminal may release the first connection after the first timer expires. Herein, that the terminal releases the first connection includes: configuration of all the foregoing protocol stack entities of the first connection is cleared, or a context of the terminal is released, or all or some resources of the terminal on a first network device side are released. According to the method, the terminal can determine when to release the first connection, release resources in time, and avoid a waste of resources.

The terminal establishes the second connection based on the received configuration information of the second connection, and the terminal communicates with the second network device by using the second connection.

In this embodiment of this application, the first connection and the second connection may be used to transmit data packets that belong to a same QoS flow.

Sending of the SN status transfer message and forwarding of a data packet between the first network device and the second network device cause latency of a handover process, and especially, when backhaul between the first network device and the second network device is not satisfactory, the latency is relatively high. According to the method in this embodiment of this application, after receiving the first message, the terminal maintains the connection to the first network device, and establishes the connection to the second network device, so that the first network device and the second network device may not perform SN status transfer or data packet forwarding. This reduces latency in a handover process and improves the transmission efficiency.

In a possible manner, because the terminal maintains the first connection and establishes the second connection in the handover process, in a downlink transmission scenario, if data packets transmitted on the first connection and the second connection are not data packets obtained in a data packet duplication manner, processing of the data packets transmitted on the first connection and the second connection may include: A PDCP entity of the terminal performs duplicate packet detection on data packets that belong to a same connection, and does not perform the duplicate packet detection on data packets that belong to different connections. This can avoid a packet loss, and improve data transmission reliability.

Optionally, the terminal may determine, by using indication information sent by the first network device, whether the data packets transmitted on the first connection and the second connection are data packets obtained in the data packet duplication manner. Alternatively, the terminal may determine, by using packet header information of the data packets, whether the data packets transmitted on the first connection and the second connection are data packets obtained in the data packet duplication manner. The packet header information includes information indicating whether the data packet is a data packet obtained in the data packet duplication manner.

Figure 6:
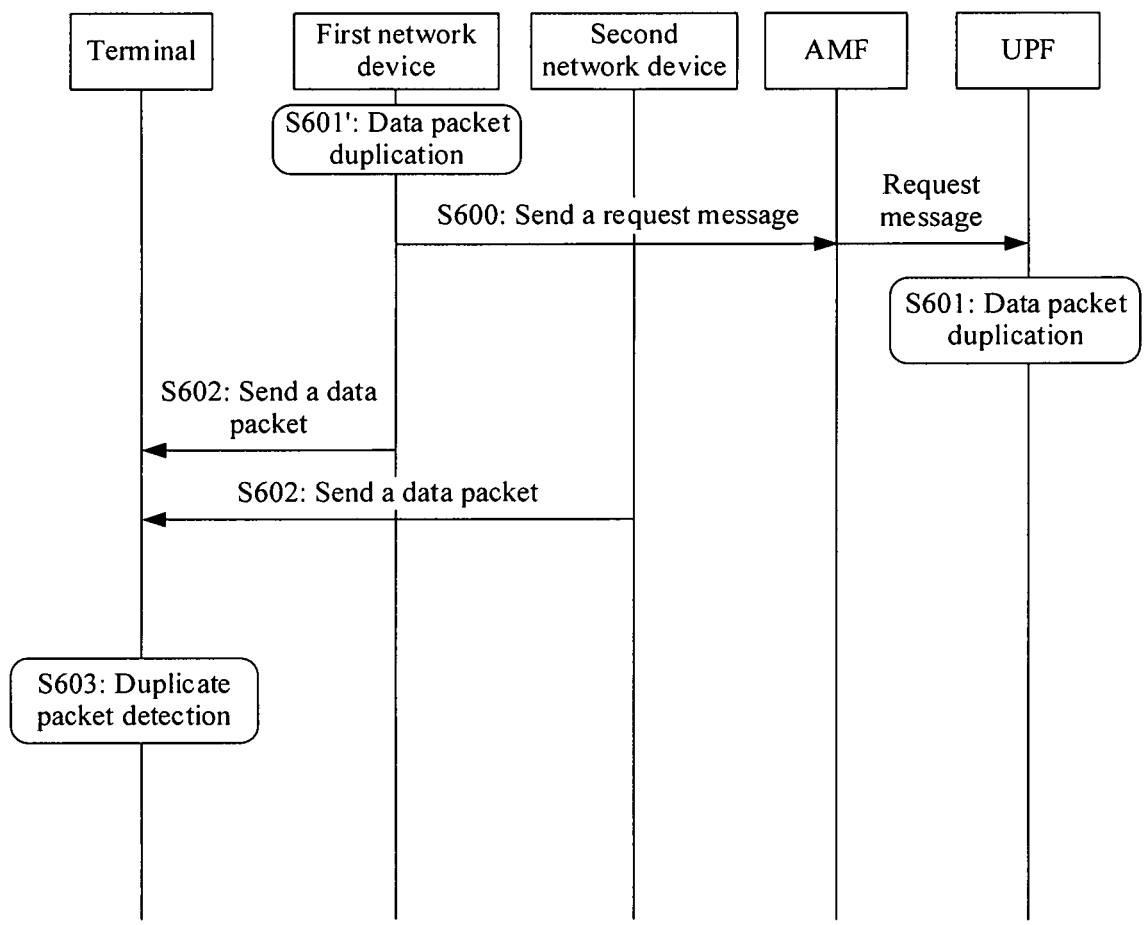
FIG. 6 is a schematic flowchart of a communication method according to an embodiment of this application.

For processing in a scenario in which the data packets transmitted on the first connection and the second connection are data packets obtained in the data packet duplication manner, refer to corresponding operations in the embodiment shown in FIG. 6.

Further, the communication method in this embodiment of this application may further include: corresponding processing is performed on the data packets transmitted on the first connection and the second connection by using the terminal or an upper-layer entity of a PDCP entity of the first network device or the second network device. The corresponding processing may include reordering and in-order delivery. Optionally, the corresponding processing may further include a deduplication operation. The upper-layer entity of the PDCP entity herein may be, for example, a transmission control protocol (tTCP) entity or another entity. This is not limited in this embodiment of this application. It may be understood that, for downlink data packets, the terminal starts different receive windows for data packets transmitted by different network devices.

It may be understood that, before S302, a handover preparation process between the first network device and the second network device may be further included. The handover preparation process may include S300*a* and S300*b*.

S300*a*: The first network device sends a handover request message to the second network device.

After the first network device determines to hand over the terminal, the first network device may send the handover request message to the second network device, to request the second network device to confirm whether the terminal can be handed over. In a possible manner, the message used for a handover request may be the handover request message.

In a possible manner, the handover request message may include but is not limited to at least one of the following information: a target cell identifier, a cell radio network temporary identifier (C-RNTI) allocated by a source cell to the terminal, radio resource management (RRM) configuration, and access stratum (AS) configuration.

In a possible manner, the handover request message may further carry indication information. The indication information is used to indicate that the second connection needs to be configured. In other words, the indication information is used to indicate to the second network device to provide the configuration information of the second connection for the terminal. After receiving the indication information, the second network device provides the configuration information of the second connection for the terminal. For example, when the PDCP entity corresponding to the first connection and the PDCP entity corresponding to the second connection are independent, the indication information may be used to indicate the second network device to configure the PHY entity configuration information, the MAC entity configuration information, the RLC entity configuration information, and the PDCP entity configuration information for the second connection. When the first connection and the PDCP entity share the PDCP entity, the indication information may be used to indicate the second network device to configure the PHY entity configuration information, the MAC entity configuration information, and the RLC entity configuration information for the second connection. Correspondingly, a protocol stack corresponding to the second connection is also established on the second network device, and configuration of the protocol stack is the same as configuration of the protocol stack that corresponds to the second connection and that is established by the terminal.

S300*b*: The second network device feeds back an acknowledgment message to the first network device.

After performing admission control based on the handover request message sent by the first network device, the second network device feeds back the acknowledgment message to the first network device. The acknowledgment message may include the configuration information of the second connection, and the configuration information that is of the second connection and that is in the acknowledgment message is consistent with the configuration information of the second connection in the first message. In other words, the configuration information that is of the second connection and that is received by the terminal is configured by the second network device and then transmitted to the terminal by using the first network device.

Optionally, the acknowledgment message may further include a physical identifier of the target cell. This is not limited in this embodiment of this application.

Optionally, after S304, the method may further include the following steps.

S306: The terminal initiates random access to the second network device, and after the random access is completed, the terminal sends, to the second network device, a message used to indicate that radio resource control (RRC) reconfiguration is completed, for example, may be an RRC reconfiguration complete message.

A random access process between the terminal and the second network device may include, for example, but is not limited to: the terminal sends a preamble index to the second network device, after receiving the preamble index, the second network device returns a random access response (RAR) to the terminal, and after the random access is completed (in other words, the terminal receives the RAR), the terminal sends the RRC reconfiguration complete message to the second network device.

In a possible manner, if the first connection and the second connection share the PDCP entity, the RRC reconfiguration complete message may include a PDCP SN (referred to as a first sequence number). The PDCP SN is a start sequence number value of a PDCP SN allocated by the target base station to a new downlink data packet that is from the core network and to which no PDCP sequence number is allocated. A PDCP entity of the target base station may allocate a PDCP sequence number based on the PDCP SN carried in the RRC reconfiguration complete message. In a handover process, the terminal receives, by using the first connection, a data packet before the first sequence number and decrypts the data packet by using an old key, and receives, by using the second connection, a data packet after the first sequence number and decrypts the data packet by using a new key.

S308. The second network device indicates to the terminal to release the first connection.

In a possible manner, after receiving the RRC reconfiguration complete message of the terminal, the second network device performs a path change procedure with the core network device, to switch a downlink to the second network device, so that a downlink data packet from the core network is transmitted to the terminal by using the second network device. The core network device herein may include, for example, an access and mobility management function (AMF) and a user plane function (UPF). If the core network device completes the path change procedure, the core network device may send a path change complete message to the second network device. Further, the second network device may send a message to the terminal, to indicate the terminal to release the first connection. After the first connection is released, the terminal no longer performs data transmission with the first network device. Herein, that the terminal is indicated to release the first connection may be triggered by using explicit indication information or in another manner, so that the terminal releases the first connection. According to the method, the terminal can determine when to release the first connection, release resources in time, and avoid a waste of resources.

Optionally, the second network device may indicate, by using one of an RRC message, a layer 1 message, a layer 2 message, and end marker indication information, to the terminal to release the first connection. The layer 2 message may be, for example, a MAC control element (CE). The end marker is used to indicate a PDCP sequence number (SN) of the last downlink data packet sent by the first network device to the terminal.

The message for configuring the first timer and the message for releasing the first connection may be implemented by either or both of them. It should be noted that the terminal releases the first connection when any one of the following cases is met: the first timer expires or a message for indicating the terminal to release the first connection is received.

As described above, according to the communication method in this embodiment of this application, the first network device usually does not need to perform a sequence number status and a data packet forwarding procedure. For example, in a high-speed scenario, a data packet in a buffer of a source base station can be transmitted before the link quality of the source cell deteriorates, a packet loss probability is relatively low, and the data packets on the source side can be completely sent on the first connection.

However, in some special scenarios, the first network device may forward data packets for some data packets. For example, when the first network device finds that link quality of a source cell deteriorates or the first network device detects that the terminal has left the source cell. For downlink transmission, the first network device may forward, to the second network device, a data packet that cannot be sent by the source cell and/or that has not been sent to the terminal, and the second network device processes the data packet forwarded by the first network device and sends the processed data packet to the terminal. The processing performed by the second network device on the forwarded data packet may include, for example, but is not limited to: the PDCP entity of the second network device allocates a PDCP SN to the forwarded data packet, performs header compression and encryption on the forwarded data packet, adds a PDCP header to the forwarded data packet, and the like. For uplink transmission, the first network device may forward, to the second network device, a data packet that cannot be sent by the source cell and/or that has not been sent to the core network, and the second network device processes the data packet forwarded by the first network device and sends the processed data packet to the core network device. The processing performed by the second network device on the forwarded data packet may include, for example, but is not limited to: the PDCP entity of the second network device removes a PDCP header for the forwarded data packet, performs decryption, reordering, header decompression, in-order delivery, and duplicate packet detection on the forwarded data packet, and the like. In the foregoing manner, a packet loss problem that may be caused in a special scenario can be avoided, to ensure reliability of data packet transmission.

An embodiment of this application further provides a communication method. The method may be applicable to a scenario in which the terminal transmits data by using both the first connection and the second connection in the foregoing embodiment, or may be applicable to another scenario in which the terminal transmits data to at least two corresponding network devices by using at least two connections. It is assumed that there is a first connection between the terminal and a first network device, and there is a second connection between the terminal and a second network device. The first network device may be, for example, a source base station, and the second network device may be, for example, a target base station. As shown in FIG. 6, the method may include the following steps.

S601: Data packet duplication is performed on a core network device.

Herein, that the data packet duplication is performed on the core network device means that a same data packet of a same QoS flow is duplicated to generate two copies, and the two copies are separately transmitted to the first network device and the second network device.

Optionally, a network element or a functional entity that perform the data packet duplication on the core network device may be, for example, a UPF. The UPF has a capability of duplicating a data packet. For example, the UPF performs a data packet duplication function. Optionally, the core network device may allocate a higher layer sequence number to the data packet. After performing the data packet duplication, the core network device sends a same sequence number of the data packet to the first network device and the second network device.

In a possible manner, the higher layer sequence number herein may be an application layer sequence number generated by the UPF. This is not limited in this embodiment of this application.

Optionally, before 5S01, the method may further include the following steps.

S600: The first network device sends a request message to the core network device, to request the core network device to perform the data packet duplication.

In a possible manner, after sending a first message to the terminal, the first network device sends a request message to an AMF. After receiving the request message, the AMF relays the message to the UPF. Herein, relay may be transparent transmission or transmission after processing. In this way, the UPF is requested to perform the data packet duplication. In other words, S601 is performed.

The first message is a message used to indicate to the terminal to hand over from the first network device to the second network device.

It may be understood that S600 and S601 are optional. In other words, the data packet duplication may not be implemented by using the core network device. For example, the data packet duplication may be implemented by using the first network device. In this case, S600 and S601 may be replaced with S601'. S601': The first network device performs the data packet duplication after sending the first message or receiving a second message. The second message is a message that is sent by the second network device to the first network device and that is used to acknowledge that the terminal is allowed to hand over to the second network device, for example, may be a handover request acknowledgment message.

The data packet duplication performed on the first network device includes: A PDCP entity of the first network device allocates a PDCP SN to a data packet, and the PDCP entity of the first network device simultaneously sends a same data packet of a same QoS flow to the second network device after duplication. After the duplication, PDCP SNs of same data packets are the same, and may be a PDCP service data unit (SDU) or a PDCP protocol data unit (PDU) with a same PDCP SN.

In a scenario shown in FIG. 4, if the first network device sends a PDCP SDU to the second network device, to which the PDCP entity of the first network device allocates a PDCP SN, a PDCP entity of the second network device may perform processing such as encryption and PDCP header adding on the PDCP SDU received from the first network device, and then send the PDCP SDU to the terminal. If the first network device sends a PDCP PDU to the second network device, that is, the PDCP entity of the first network device performs processing such as PDCP SN allocating, header compression, encryption, and PDCP header adding on the data packet, the second network device directly sends the PDCP PDU sent by the first network device to the terminal.

However, in a scenario shown in FIG. 5, the first network device sends a PDCP PDU to the second network device, and the second network device directly sends the PDCP PDU sent by the first network device to the terminal.

In the manner of S601', it can be ensured that duplicated data packets transmitted by the first network device and the second network device have a same PDCP SN, to avoid the out-of-order problem.

S602: The first network device and the second network device separately send a data packet to the terminal by using the first connection and the second connection.

In a possible manner, the data packets transmitted on the first connection and the second connection may be transmitted by the core network device. In another possible manner, a data packet on the second connection is duplicated and sent to the second network device by the first network device, and transmitted by the second network device to the terminal.

It should be noted that meanings of the first connection and the second connection described in the embodiment in FIG. 6 may be the same as or different from the meanings of the first connection and the second connection described in the embodiments in FIG. 3 to FIG. 5.

S603: The terminal receives data packets by using the first connection and the second connection, and the terminal performs duplicate packet detection on the received data packets.

If the terminal detects that two successfully received data packets are duplicate, one of the duplicate data packets may be discarded.

Optionally, information that indicates the terminal to perform the duplicate packet detection on the data packets that belong to the first connection and the second connection may be sent to the terminal. A data packet duplication manner mentioned in S601 or S601' may also be referred to as a duplication mode. If the terminal receives the information used to indicate to the terminal to perform the duplicate packet detection on the data packets that belong to the first connection and the second connection, it may be learned that the data packets currently sent by a network side is obtained in the duplication mode. The terminal performs the duplicate packet detection, and the information used to indicate to the terminal to perform the duplicate packet detection on the data packets that belong to the first connection and the second connection may be carried in the first message or another message. Alternatively, packet header information of a data packet may be used to indicate whether the data packets transmitted on the first connection and the second connection are data packets obtained in the data packet duplication manner, and the packet header information includes information indicating whether the data packet is a data packet obtained in the data packet duplication manner.

Optionally, how to stop data packet duplication may be implemented in one of the following manners.

(1) In a possible manner, a time length of a second timer may be further carried in the first message or another message that carries information for indicating to the terminal to perform the duplicate packet detection on the data packets that belong to the first connection and the second connection, and the second timer is configured to control a validity period of the duplication mode. After the timer expires, it means that the data packet duplication is stopped on the first network device or on the core network device.

(2) In another possible manner, the first network device may send an indication for stopping the data packet duplication to the terminal, and the first network device may send the indication for stopping the data packet duplication after all data packets of the first network device are transmitted. The indication may be sent by using an RRC message, a physical layer message, or a MAC CE. This is not limited in this embodiment of this application.

(3) In still another possible manner, the terminal may control the first network device to stop the data packet duplication. For example, after the terminal successfully accesses a target cell (for example, after the terminal receives a random access response or the terminal sends an RRC reconfiguration complete message), the terminal sends an indication for stopping the data packet duplication, the indication may be sent by using an RRC message, a physical layer message, or a MAC CE. This is not limited in this embodiment of this application.

(4) In yet another possible manner, if the core network device performs the data packet duplication, after the second network device receives the RRC reconfiguration complete message sent by the terminal, the second network device sends an indication for stopping the data packet duplication to the AMF, and the AMF relays the indication for stopping the data packet duplication to the UPF. Herein, relay may be transparent transmission or transmission after processing. In this way, the UPF is requested to stop the data packet duplication. Then, the UPF sends a subsequent data packet to the second network device.

(5) In still yet another possible manner, if the data packet duplication is performed by the core network device, after the first network device receives a terminal context release message or a handover success indication sent by the second network device, the first network device sends an indication for stopping the data packet duplication to the AMF, and the AMF relays the indication for stopping the data packet duplication to the UPF. Herein, relay may be transparent transmission or transsmission after processing. In this way, the UPF is requested to stop the data packet duplication. Then, the UPF sends a subsequent data packet to the second network device. After receiving the RRC reconfiguration complete message sent by the terminal, the second network device sends the handover success indication to the first network device.

According to the communication method in this embodiment of this application, packet loss rate can be reduced and data packet transmission reliability can be improved in the data packet duplication manner.

It may be understood that, the methods implemented by the terminal in the foregoing method embodiments may alternatively be implemented by a component (for example, an integrated circuit or a chip) that may be used for the terminal. The methods implemented by the first network device in the foregoing method embodiments may alternatively be implemented by a component (for example, an integrated circuit or a chip) that may be used for the first network device. The methods implemented by the second network device in the foregoing method embodiments may alternatively be implemented by a component (for example, an integrated circuit or a chip) that may be used for the second network device.

Corresponding to the method and the steps implemented in the communication methods provided in the foregoing method embodiments, an embodiment of this application further provides a corresponding communications apparatus. The communications apparatus includes corresponding modules configured to perform each part in the embodiment shown in FIG. 3 or FIG. 6. The module may be software, hardware, or a combination of software and hardware.

Figure 7:
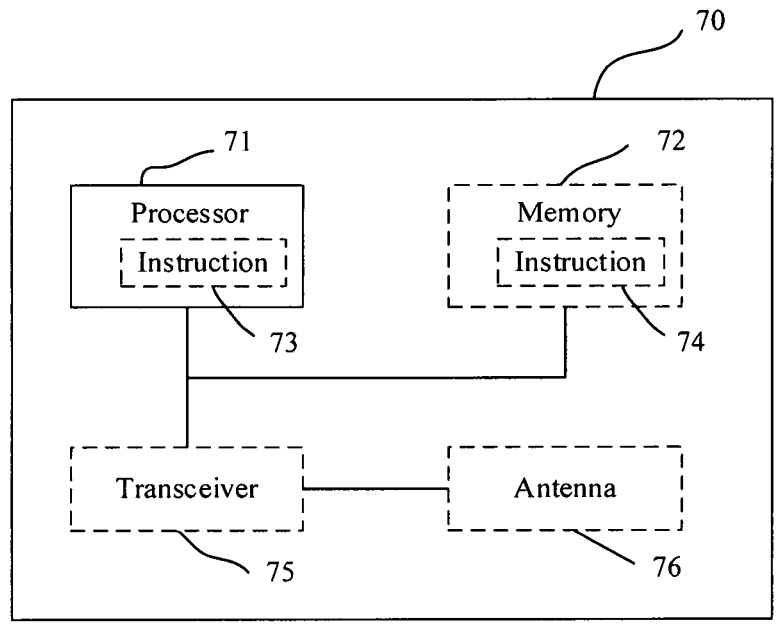
FIG. 7 is a schematic structural diagram of a communications apparatus according to an embodiment of this application.

FIG. 7 is a schematic structural diagram of a communications apparatus. The communications apparatus 70 may be the network device 20 or the terminal 10 in FIG. 1 and FIG. 2, or may be the core network device mentioned in the foregoing method embodiments. The communications apparatus may be configured to implement the method that corresponds to the first network device, the second network device, the terminal, or the core network device and that is described in the foregoing method embodiments. For details, refer to the descriptions in the foregoing method embodiments.

The communications apparatus 70 may include one or more processors 71. The processor 71 may also be referred to as a processing unit, and may implement a specific control function. The processor 71 may be a general purpose processor, a dedicated processor, or the like, for example, may be a baseband processor or a central processing unit. The baseband processor may be configured to process a communications protocol and communications data. The central processing unit may be configured to: control the communications apparatus (for example, a base station, a baseband chip, a DU, or a CU), execute a software program, and process data of the software program.

In an optional design, the processor 71 may alternatively store an instruction 73, and the instruction may be run by the processor, so that the communications apparatus 70 performs the method that corresponds to the first network device, the second network device, the terminal, or the core network device and that is described in the foregoing method embodiments.

In another possible design, the communications apparatus 70 may include a circuit. The circuit may implement the sending, receiving, or communication function in the foregoing method embodiments.

Optionally, the communications apparatus 70 may include one or more memories 72. The memory 72 stores an instruction 74, and the instruction may be run on the processor, so that the communications apparatus 70 performs the method described in the foregoing method embodiment. Optionally, the memory may also store data. Optionally, the processor may also store an instruction and/or data. The processor and the memory may be disposed separately, or may be integrated together.

Optionally, the communications apparatus 70 may further include a transceiver 75 and/or an antenna 76. The processor 71 may be referred to as a processing unit, and controls a communications apparatus (a terminal or a base station). The transceiver 75 may be referred to as a transceiver unit, a transceiver, a transceiver circuit, or the like, and is configured to implement sending and receiving functions of the communications apparatus.

In a design, the communications apparatus (for example, an integrated circuit, a wireless device, a circuit module, a network device, or a terminal device) may include a processor and a transceiver. If the communications apparatus is configured to implement an operation corresponding to the first network device, for example, the transceiver 75 may send configuration information of a second connection to the terminal by using a first message, and communicate with the terminal by using a first connection. The processor controls not to perform operations of sending a sequence number status transfer message to the second network device and forwarding a data packet to the second network device. Alternatively, the transceiver may send, to the terminal by using the first connection, a data packet obtained in a data packet duplication manner, and the processor performs a data packet duplication operation.

In another design, if the apparatus is configured to implement an operation corresponding to the second network device, for example, the processor may determine configuration information of a second connection, the transceiver sends the configuration information of the second connection to the first network device, and communicates with the terminal by using the second connection. Alternatively, the transceiver may receive, from a core network device or the first network device, a data packet obtained in a data packet duplication manner, and send the data packet to the terminal by using the second connection. The processor generates an indication for stopping data packet duplication, and sends the indication to the core network device by using the transceiver, or the processor generates a terminal context release message or a handover success indication, and sends the terminal context release message or the handover success indication to the first network device by using the transceiver.

In still another design, if the communications apparatus is configured to implement an operation corresponding to the terminal, for example, the transceiver may receive configuration information of a second connection from the first network device by using a first message, the processor is configured to maintain a first connection for communication between the terminal and the first network device, and establish the second connection based on the configuration information of the second connection.

In yet another design, if the communications apparatus is configured to implement an operation corresponding to a core network device, for example, the transceiver may receive a request that is sent by the first network device and that is used to request the core network device to perform data packet duplication, the processor performs the data duplication, and separately transfers a duplicated data packet to the first network device and the second network device by using the transceiver.

The processor and the transceiver described in this application may be implemented on an integrated circuit (IC), an analog IC, a radio frequency integrated circuit RFIC, a hybrid signal IC, an application specific integrated circuit (ASIC), a printed circuit board (PCB), an electronic device, or the like. The processor and the transceiver may also be manufactured by using various IC process technologies, for example, a complementary metal oxide semiconductor (CMOS), an N-metal oxide semiconductor (NMOS), a positive channel metal oxide semiconductor (PMOS), a bipolar junction transistor (BJT), a bipolar CMOS (BiCMOS), silicon germanium (SiGe), and gallium arsenide (GaAs).

In the foregoing embodiment description, the communications apparatus is described by using the network device 20 or the terminal 10 as an example. However, the scope of the communications apparatus described in this application is not limited to the network device, and the structure of the communications apparatus may not be limited by FIG. 7. The communications apparatus may be an independent device or may be a part of a relatively large device. For example, the device may be:

(1) An independent integrated circuit (IC), a chip, or a chip system or subsystem;

(2) A set of one or more ICs. Optionally, the IC set may also include a storage component configured to store data and/or an instruction.

(3) An ASIC, for example, a modem (MSM);

(4) A module that can be embedded in another device;

(5) A receiver, a terminal, a cellular phone, a wireless device, a hand-held phone, a mobile unit, a network device, or the like; and (6) Another device, or the like.

Figure 8:
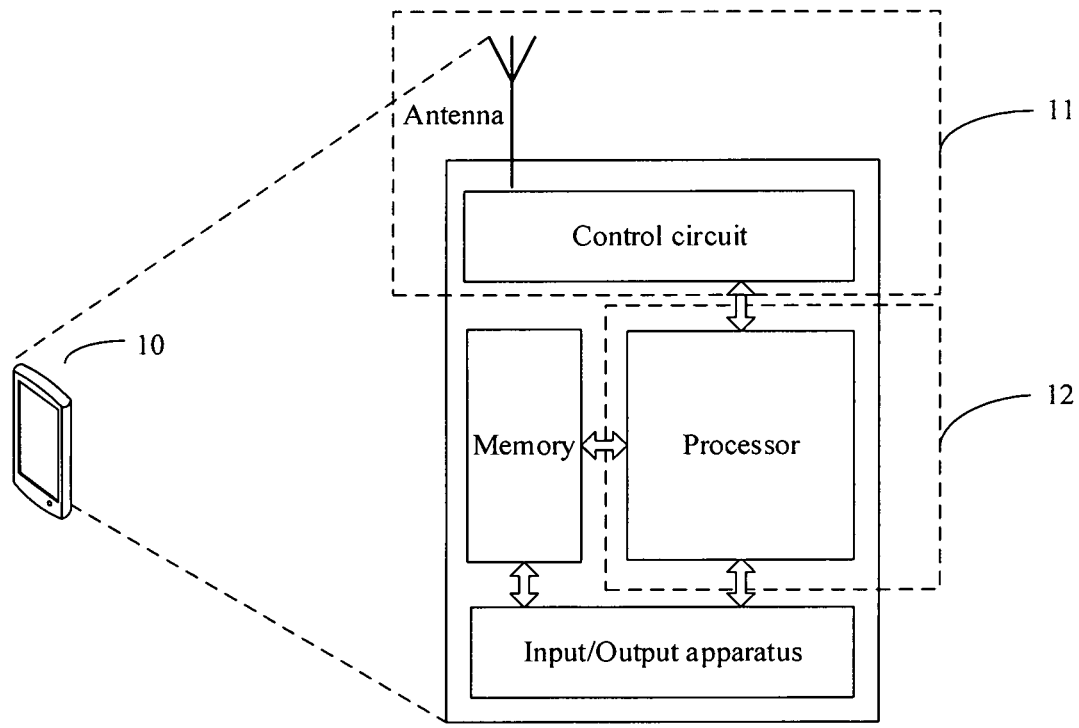
FIG. 8 is a schematic structural diagram of a terminal according to an embodiment of this application.

FIG. 8 is a schematic structural diagram of a terminal. The terminal may be applicable to the system shown in FIG. 1. For ease of description, FIG. 8 shows merely main components of the terminal. As shown in FIG. 8, a terminal 10 includes a processor, a memory, a control circuit, an antenna, and an input/output apparatus. The processor is mainly configured to: process a communications protocol and communication data, control the entire terminal, execute a software program, and process data of the software program. The memory is mainly configured to store a software program and data. A radio frequency circuit is mainly configured to perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user.

After the terminal or user equipment is turned on, the processor may read a software program stored in a storage unit, interpret and execute an instruction of the software program, and process data of the software program. When data needs to be sent in a wireless manner, the processor performs baseband processing on the to-be-sent data, and outputs a baseband signal to the radio frequency circuit. After performing radio frequency processing on the baseband signal, the radio frequency circuit sends the radio frequency signal by using the antenna in an electromagnetic wave form. When data is sent to the user equipment, the radio frequency circuit receives a radio frequency signal by using the antenna, converts the radio frequency signal into a baseband signal, and outputs the baseband signal to the processor, and the processor converts the baseband signal into data and processes the data.

A person skilled in the art may understand that for ease of description, FIG. 8 shows only one memory and one processor. An actual terminal may include a plurality of processors and a plurality of memories. The memory may also be referred to as a storage medium, a storage device, or the like. This is not limited in this embodiment of the present invention.

In an optional implementation, the processor may include a baseband processor and a central processing unit. The baseband processor is mainly configured to process a communications protocol and communication data. The central processing unit is mainly configured to: control the entire user equipment, execute a software program, and process data of the software program. The processor in FIG. 8 integrates functions of the baseband processor and the central processing unit. A person skilled in the art may understand that the baseband processor and the central processing unit may be processors independent of each other, and are interconnected by using a technology such as a bus. A person skilled in the art may understand that the user equipment may include a plurality of baseband processors to adapt to different network standards, the user equipment may include a plurality of central processing units to enhance a processing capability of the user equipment, and components of the user equipment may be connected via various buses. The baseband processor may also be expressed as a baseband processing circuit or a baseband processing chip. The central processing unit may also be expressed as a central processing circuit or a central processing chip. A function of processing the communications protocol and the communication data may be built in the processor, or may be stored in the storage unit in a software program form. The processor executes the software program, to implement a baseband processing function.

In an example, the antenna and the control circuit that have a sending/receiving function may be considered as a transceiver unit 11 of the terminal 10, and the processor having a processing function may be considered as a processing unit 12 of the terminal 10. As shown in FIG. 8, the terminal 10 includes the transceiver unit 11 and the processing unit 12. The transceiver unit may also be referred to as a transceiver, a transceiver machine, a transceiver apparatus, or the like. Optionally, a component that is in the transceiver unit 11 and that is configured to implement a receiving function may be considered as a receiving unit, and a component that is in the transceiver unit 101 and that is configured to implement a sending function may be considered as a sending unit. In other words, the transceiver unit 11 includes the receiving unit and the sending unit. For example, the receiving unit may also be referred to as a receiver machine, a receiver, a receiver circuit, or the like, and the sending unit may be referred to as a transmitter machine, a transmitter, a transmit circuit, or the like.

Figure 9:
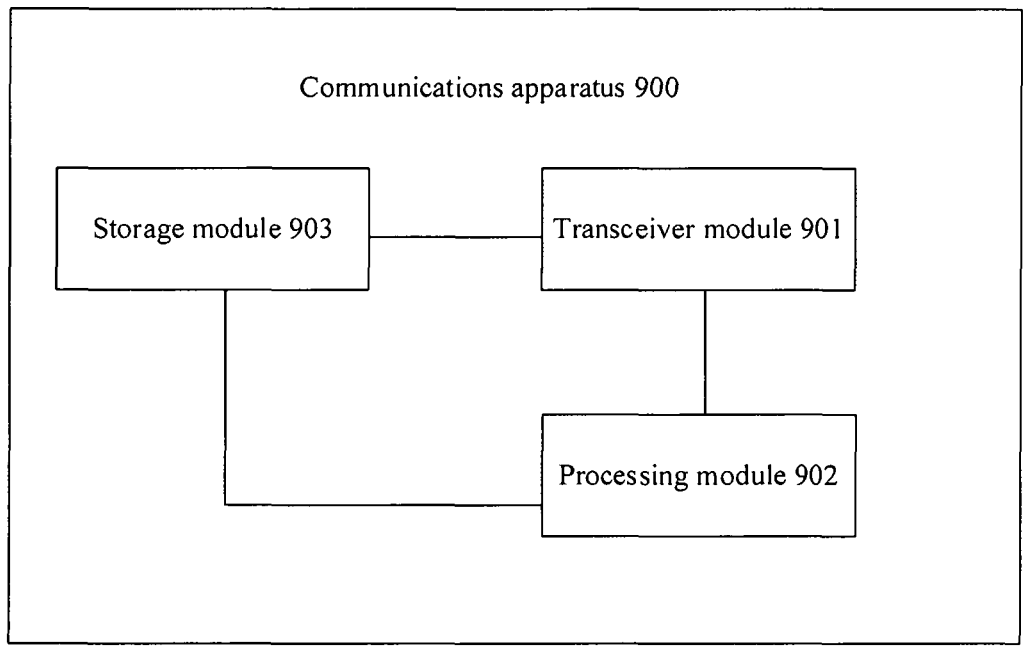
FIG. 9 is a schematic structural diagram of a communications apparatus according to an embodiment of this application.

As shown in FIG. 9, another embodiment of this application provides a communications apparatus 900. The communications apparatus may be a terminal, or may be a component (for example, an integrated circuit or a chip) of the terminal, or may be another communications module. The communications apparatus is configured to implement an operation corresponding to the terminal in the method embodiment shown in FIG. 3 or FIG. 6. The communications apparatus may include a transceiver module 901 and a processing module 902. Optionally, the communications apparatus may further include a storage module 903.

Corresponding to the embodiment shown in FIG. 3, the transceiver module 901 is configured to receive a first message from a first network device. The first message includes configuration information of a second connection that communicates with a second network device, and the first message is a message used to indicate a terminal to hand over from the first network device to the second network device, for example, an RRC reconfiguration message.

The processing module 902 is configured to maintain a first connection for communication between the terminal and the first network device, and establish the second connection based on the configuration information of the second connection. A PDCP entity corresponding to the second connection and a PDCP entity corresponding to the first connection are a same PDCP entity or different PDCP entities.

Optionally, the second connection and the first connection are used to transmit data packets that belong to a same quality of service flow.

In a possible manner, when the PDCP entity corresponding to the first connection and the PDCP entity corresponding to the second connection are different PDCP entities, the first message received by the transceiver module 901 includes PHY entity configuration information, MAC entity configuration information, RLC entity configuration information, and PDCP entity configuration information.

In a possible manner, when the PDCP entity corresponding to the second connection and the PDCP entity corresponding to the first connection are a same PDCP entity, the first message received by the transceiver module 901 includes PHY entity configuration information, MAC entity configuration information, and RLC entity configuration information. Optionally, the first message may include first indication information, the first indication information is used to indicate the terminal to maintain the first connection after receiving the first message, and the processing module 902 is configured to maintain the first connection based on the first indication information.

Optionally, the first message may further include a time length of a first timer, the first timer is configured to control when to release the first connection, and the processing module 902 starts the first timer after receiving the time length of the first timer.

Optionally, after random access to the second network device is completed, the transceiver module 901 may be further configured to receive, from the second network device, information used to indicate the terminal to release the first connection, and the processing module 902 is configured to release the first connection based on the information.

If data packets obtained in a data packet duplication manner are transmitted on the first connection and the second connection, the first message received by the transceiver module 901 may further include information used to indicate the terminal to perform duplicate packet detection on the data packets on the first connection and the second connection, and the processing module 902 performs the duplicate packet detection on the data packets on the first connection and the second connection based on the information.

It may be understood that, if the data packets transmitted on the first connection and the second connection are not obtained in the data packet duplication manner, the processing module 902 does not perform the duplicate packet detection on the data packets that belong to different connections but have a same PDCP SN.

Optionally, the transceiver module 901 may be further configured to send an RRC reconfiguration complete message to the second network device after random access is completed.

Optionally, after successfully accessing the second network device, the transceiver module 901 may be further configured to send indication information used to stop data packet duplication to the first network device.

Optionally, the processing module 902 may further perform corresponding processing on the data packets transmitted by using the first connection and the second connection. The corresponding processing may include reordering and in-order delivery, and may further include deduplication.

After receiving the first message, the communications apparatus 900 maintains the connection to the first network device, and establishes the connection to the second network device. Therefore, in a handover process, the first network device and the second network device may not perform SN status transfer or data packet forwarding. This can reduce latency in the handover process and improve transmission efficiency.

Corresponding to the embodiment shown in FIG. 6, the transceiver module 901 is configured to receive a data packet from the first network device by using the first connection, and receive a data packet from the second network device by using the second connection. The processing module 902 is configured to perform duplicate packet detection on the received data packets. In a possible manner, the transceiver module 901 is further configured to receive, from the first network device, information used to indicate to the terminal to perform duplicate packet detection on data packets that belong to the first connection and the second connection, so that the processing module 902 determines, based on the indication information, that duplicate packet detection needs to be performed. In another possible manner, the processing module 902 is configured to determine, based on packet header information of a data packet, whether the data packets received by using the first connection and the second connection are data packets obtained in the data packet duplication manner. Optionally, the information used to indicate the terminal to perform duplicate packet detection on the data packets that belong to the first connection and the second connection may be carried in the first message, the first message may further include a time length of a second timer, and the second timer is used to control a validity period of a duplication mode. Optionally, the transceiver module 901 is further configured to send, to the first network device, information used to indicate to stop data packet duplication, or the transceiver module 901 may be further configured to receive an indication used to stop data packet duplication from the first network device.

For the embodiments shown in FIG. 3 and FIG. 6, the storage module 903 is configured to store at least one of a parameter, information, and an instruction.

It may be understood that, similar to the structure of the communications apparatus shown in FIG. 6, the communications apparatus may also be configured to implement operations or steps performed by the core network device in the embodiment shown in FIG. 6. In this case, the transceiver module 901 is configured to receive a request that is sent by the first network device and that is used to request the core network device to perform data packet duplication. The processing module 902 is configured to perform data packet duplication, and separately transmit a duplicated data packet to the first network device and the second network device by using the transceiver module 901. Optionally, the transceiver module 901 may be further configured to receive, from the second network device or the first network device, an indication for stopping the data packet duplication, and after receiving the indication, the processing module 902 is configured to stop the data packet duplication.

In a possible design, one or more modules in FIG. 9 may be implemented by one or more processors, or may be implemented by one or more processors and memories, or may be implemented by one or more processors and transceivers, or may be implemented by one or more processors, memories, and transceivers. This is not limited in this embodiment of this application. The processor, the memory, and the transceiver may be separately disposed, or may be integrated.

It should be noted that, for descriptions of the first connection, the second connection, the first message, and another message, information, an indication, or another parameter, refer to related descriptions in the foregoing method embodiments.

It should be noted that, for operations and implementations of the modules in the communications apparatus 900 in this embodiment of this application, further refer to corresponding descriptions in the foregoing corresponding method embodiments.

Corresponding to the method and the steps implemented by the first network device in the communication methods provided in the foregoing method embodiments, an embodiment of this application further provides a corresponding communications apparatus. The communications apparatus includes corresponding modules configured to perform each part in FIG. 3 or FIG. 6. The module may be software, hardware, or a combination of software and hardware.

Figure 10:
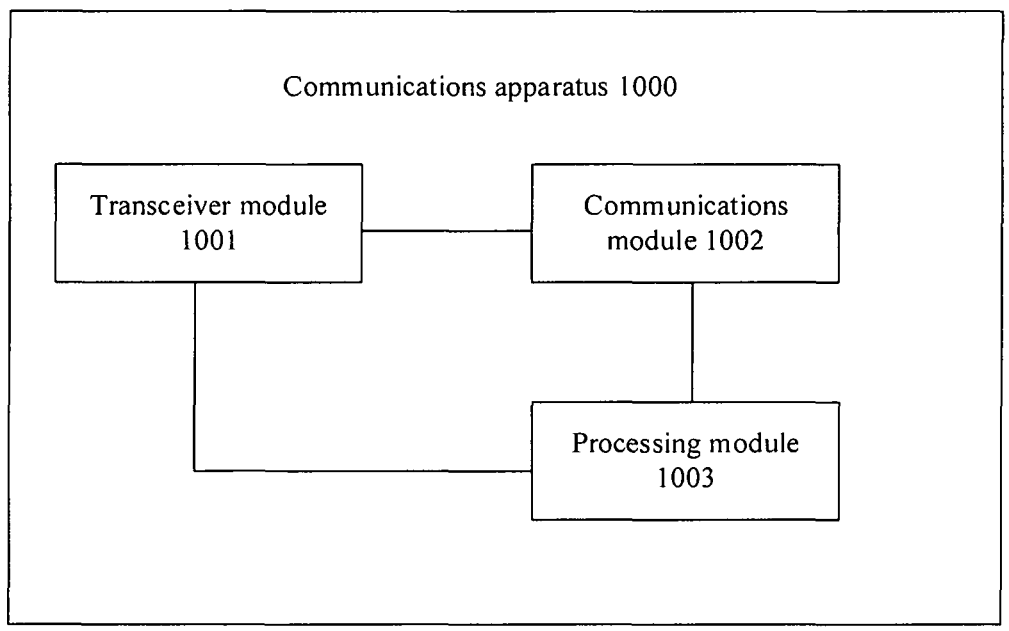
FIG. 10 is a schematic structural diagram of a communications apparatus according to an embodiment of this application.

As shown in FIG. 10, an embodiment of this application provides a communications apparatus. The communications apparatus may be a first network device, or may be a component (for example, an integrated circuit or a chip) of the first network device, or may be another communications module. The communications apparatus 1000 may include a transceiver module 1001, a communications module 1002 and a processing module 1003. Optionally, the communications apparatus may further include a storage module.

Corresponding to the embodiment shown in FIG. 3, the transceiver module 1001 is configured to send a first message to a terminal. The first message includes configuration information of a second connection that communicates with a second network device, and the first message is a message used to indicate the terminal to hand over from a first network device to the second network device. A PDCP entity corresponding to the second connection and a PDCP entity corresponding to a first connection are a same PDCP entity or different PDCP entities.

The communications module 1002 is configured to communicate with the terminal by using the first connection, and the first connection is a connection used for communication between the terminal and the first network device.

In addition, the communications apparatus 1000 may control, by using the processing module 1003, not to perform operations of sending a sequence number status transfer message to the second network device and forwarding a data packet to the second network device.

Optionally, the transceiver module 1001 in this embodiment of this application may further send information used to indicate whether data packets transmitted on the first connection and the second connection are data packets obtained in a data packet duplication manner.

Optionally, the transceiver module 1001 may be further configured to send a handover request message to the second network device.

Optionally, the transceiver module 1001 may be further configured to receive an acknowledgment message from the second network device. For a description of the acknowledgment message, refer to related descriptions in the foregoing method embodiment.

Corresponding to the embodiment shown in FIG. 6, the communications module 1002 is configured to communicate with the terminal by using the first connection, for example, send a data packet to the terminal by using the first connection, and the data packet is a data packet obtained in a data packet duplication manner. Data packet duplication may be implemented by a core network device, or may be implemented by the first network device. If the data packet duplication is implemented by the core network device, the transceiver module 1001 is configured to send a request message to the core network device, and receive a data packet sent by the core network device, and the request message is used to request the core network device to perform data packet duplication. If the data packet duplication is implemented by the first network device, the transceiver module 1001 is configured to receive a second message from the second network device, and send the first message to the terminal. After the transceiver module 1001 receives the second message or sends the first message, the processing module 1003 performs a data packet duplication operation.

Corresponding to the embodiment in FIG. 6, optionally, the transceiver module 1001 may be further configured to send information for indicating to the terminal to perform duplicate packet detection on data packets that belong to the first connection and the second connection. Alternatively, the processing module 1003 adds information to a header of a data packet to indicate whether the data packet is a data packet obtained in a data packet duplication manner.

Corresponding to the embodiment in FIG. 6, optionally, the transceiver module 1001 may be further configured to send a time length of a second timer to the terminal. The second timer is configured to control a validity period of a duplication mode. Alternatively, the transceiver module 1001 may be further configured to send an indication for stopping data packet duplication to the terminal. Alternatively, the transceiver module 1001 may be further configured to receive an indication for stopping data packet duplication from the terminal. Alternatively, after receiving a terminal context release message or a handover success indication from the second network device, the transceiver module 1001 may further send an indication for stopping data packet duplication to the core network device.

Optionally, corresponding to the embodiments shown in FIG. 3 or FIG. 6, the storage module is configured to store at least one of a parameter, information, or an indication.

It may be understood that for descriptions of the first connection, the second connection, the first message, and another message, information, or an indication or another parameter, refer to related descriptions in the foregoing method embodiment. Details are not described herein again.

It should be noted that, for operations and implementations of the modules in the communications apparatus 1000 in this embodiment of this application, further refer to corresponding descriptions in the foregoing method embodiments.

In a possible design, one or more modules in FIG. 10 may be implemented by one or more processors, or may be implemented by one or more processors and memories, or may be implemented by one or more processors and transceivers, or may be implemented by one or more processors, transceivers, and memories. This is not limited in this embodiment of this application. The processor, the memory, and the transceiver may be separately disposed, or may be integrated.

It may be understood that, similar to the structure of the communications apparatus shown in FIG. 10, the communications apparatus may also be configured to implement methods and steps implemented by the second network device in the communication method provided in the embodiment in FIG. 3 or FIG. 6. For example, corresponding to the embodiment shown in FIG. 3, the transceiver module 1001 is configured to send the configuration information of the second connection to the first network device, and the configuration information of the second connection may be carried in an acknowledgment message. For example, refer to related descriptions in the foregoing embodiment. It may be understood that the acknowledgment message may be sent based on the handover request sent by the first network device. Therefore, the transceiver module 1001 may be further configured to receive, from the first network device, a message used for the handover request. The communications module 1002 is configured to communicate with the terminal by using the second connection. The processing module 1003 is configured to determine, based on the received message used for a handover request, to provide the configuration information of the second connection for the terminal. Optionally, the transceiver module 1001 may be further configured to indicate to the terminal to release the first connection. Corresponding to the embodiment shown in FIG. 6, the transceiver module 1001 is configured to receive a duplicated data packet, and the duplicated data packet may be duplicated by a core network device, or may be duplicated by the first network device. The communications module 1002 is configured to communicate with the terminal by using the second connection, including sending a data packet to the terminal by using the second connection. Optionally, the processing module 1003 may be used to generate an indication for stopping data packet duplication, and the transceiver module 1001 may be used to send the indication to the core network device. Alternatively, the processing module 1003 may be used to generate a terminal context release message or a handover success indication, and send the terminal context release message or the handover success indication to the first network device by using the transceiver module.

A person skilled in the art may further understand that various illustrative logical blocks (illustrative logic block) and steps (step) that are listed in the embodiments of this application may be implemented by using electronic hardware, computer software, or a combination thereof. Whether the functions are implemented by using hardware or software depends on particular applications and a design requirement of the entire system. A person of ordinary skill in the art may use various methods to implement the described functions for each particular application, but it should not be considered that the implementation goes beyond the scope of the embodiments of this application.

The technologies described in this application may be implemented in various manners. For example, these technologies may be implemented by using hardware, software, or a combination of hardware and software. For hardware implementation, a processing unit configured to execute these technologies at a communications apparatus (such as a base station, a terminal, a network entity, or a chip) may be implemented in one or more general purpose processors, a digital signal processor (DSP), a digital signal processing device (DSPD), an application specific integrated circuit (ASIC), a programmable logic device (PLD), a field programmable gate array (FPGA), or another programmable logic apparatus, a discrete gate or transistor logic, a discrete hardware component, or any combination thereof. The general processor may be a microprocessor. Optionally, the general processor may also be any traditional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

A person of ordinary skill in the art may understand that various reference numerals such as "first" and "second" in this specification are merely used for differentiation for ease of description, and are not used to limit a scope of the embodiments of this application, or represent a sequence. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Steps of the methods or algorithms described in the embodiments of this application may be directly embedded into hardware, an instruction executed by a processor, or a combination thereof. The memory may be a RAM memory, a flash memory, a ROM memory, an EPROM memory, an EEPROM memory, a register, a hard disk, a removable magnetic disk, a CD-ROM, or a storage medium of any other form in the art. For example, the memory may connect to a processor so that the processor may read information from the memory and write information to the memory. Alternatively, the memory may further be integrated into a processor. The processor and the memory may be arranged in an ASIC, and the ASIC may be arranged in a terminal. Optionally, the processor and the memory may be arranged in different components of the terminal.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data packet storage device, such as a server or a data packet center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. The foregoing combination should also be included in the protection scope of the computer-readable medium.

The foregoing descriptions are implementation manners of this application, but are not intended to limit the protection scope of this application.

What is claimed is:

1. A communication method, comprising:
receiving, from a first network device, a message indicating to a terminal to hand over from the first network device to a second network device, wherein the message comprises configuration information of a second connection for communication between the terminal and the second network device, wherein the message further comprises a time length of a first timer, and the first timer is configured to control a time for releasing a first connection;
maintaining the first connection for communication between the terminal and the first network device;
establishing the second connection for communication between the terminal and the second network device based on the configuration information of the second connection, wherein a packet data convergence protocol (PDCP) entity corresponding to the second connection and a PDCP entity corresponding to the first connection are a same PDCP entity or different PDCP entities; and
sending an indication to the first network device to stop data duplication;
wherein if data packets obtained in a data packet duplication manner are transmitted on the first connection and the second connection, the message further comprises information used to indicate to the terminal to perform duplicate packet detection on the data packets on the first connection and the second connection; and
the communication method further comprises performing the duplicate packet detection on the data packets on the first connection and the second connection.

2. The method according to claim 1, wherein when the PDCP entity corresponding to the second connection and the PDCP entity corresponding to the first connection are a same PDCP entity, the configuration information of the second connection comprises physical (PHY) entity configuration information, media access control (MAC) entity configuration information, and radio link control (RLC) entity configuration information; or
when the PDCP entity corresponding to the second connection and the PDCP entity corresponding to the first connection are different PDCP entities, the configuration information of the second connection comprises: PHY entity configuration information, MAC entity configuration information, RLC entity configuration information, and PDCP entity configuration information.

3. The method according to claim 1, wherein when the PDCP entity corresponding to the second connection and the PDCP entity corresponding to the first connection are different PDCP entities, a PDCP sequence number (SN) of a data packet transmitted on the first connection is not associated with a PDCP SN of a data packet transmitted on the second connection.

4. The method according to claim 1, wherein the message further comprises first indication information, the first indication information indicates to the terminal to maintain the first connection after receiving the message, and the method further comprises:
maintaining the first connection based on the first indication information.

5. The method according to claim 1, wherein after random access to the second network device is completed, the method further comprises:
receiving, from the second network device, information used to indicate to the terminal to release the first connection, and releasing the first connection based on the information.

6. The method according to claim 1, wherein if data packets transmitted on the first connection and the second connection are not obtained in the data packet duplication manner, the duplicate packet detection is not performed on data packets that belong to different connections but have a same PDCP SN.

7. The method according to claim 1, wherein the method further comprises:
after successfully accessing the second network device, sending, by the terminal, indication information used to stop data packet duplication to the first network device.

8. The method according to claim 1, wherein if the data packets obtained in the data packet duplication manner are transmitted on the first connection and the second connection, that the data packets are data packets obtained in the data packet duplication manner is determined based on packet header information of the data packets.

9. The method according to claim 1, wherein the second connection and the first connection are used to transmit data packets that belong to a same quality of service flow.

10. The method according to claim 1, wherein the message is a radio resource control (RRC) reconfiguration message.

11. A communication method, comprising:
sending, by a first network device to a terminal, a message indicating to the terminal to hand over from the first network device to a second network device, wherein the message comprises configuration information of a second connection for communication between the terminal and the second network device, wherein the message further comprises a time length of a first timer for controlling a time for releasing a first connection, and wherein a packet data convergence protocol (PDCP) entity corresponding to the second connection and a PDCP entity corresponding to the first connection are a same PDCP entity or different PDCP entities; and
transmitting data packets to the terminal in a data duplication manner on the first connection and the second connection;
receiving an indication from the terminal to stop data duplication; wherein
the first network device does not perform operations of sending a sequence number status to the second network device and forwarding a data packet to the second network device while communicating with the terminal in the data duplication manner;
and
wherein
the message further comprises information used to indicate to the terminal to perform duplicate packet detection on the data packets on the first connection and the second connection.

12. The method according to claim 11, wherein
when the PDCP entity corresponding to the second connection and the PDCP entity corresponding to the first connection are a same PDCP entity, the configuration information of the second connection comprises physical (PHY) entity configuration information, media access control (MAC) entity configuration information, and radio link control (RLC) entity configuration information; or
when the PDCP entity corresponding to the second connection and the PDCP entity corresponding to the first connection are different PDCP entities, the configuration information of the second connection comprises: PHY entity configuration information, MAC entity configuration information, RLC entity configuration information, and PDCP entity configuration information.

13. The method according to claim 11, wherein the message further comprises first indication information, and the first indication information is used to indicate to the terminal to maintain the first connection after receiving the message.

14. A communications apparatus, comprising at least one circuitry configured to:
receive, from a first network device, a message used to indicate to a terminal to hand over from the first network device to a second network device, wherein the message comprises configuration information of a second connection for communication between the terminal and the second network device, wherein the message further comprises a time length of a first timer, and the first timer is configured to control a time for releasing a first connection;
maintain the first connection for communication between the terminal and the first network device;
establish the second connection for communication between the terminal and the second network device based on the configuration information of the second connection, wherein a packet data convergence protocol (PDCP) entity corresponding to the second connection and a PDCP entity corresponding to the first connection are a same PDCP entity or different PDCP entities; and
send an indication to the first network device to stop data duplication;
wherein if data packets obtained in a data packet duplication manner are transmitted on the first connection and the second connection, the message further comprises information used to indicate to the terminal to perform duplicate packet detection on the data packets on the first connection and the second connection; and
the at least one circuitry is configured to perform the duplicate packet detection on the data packets on the first connection and the second connection.

15. The apparatus according to claim 14, wherein when the PDCP entity corresponding to the second connection and the PDCP entity corresponding to the first connection are a same PDCP entity, the configuration information of the second connection comprises physical (PHY) entity configuration information, media access control (MAC) entity configuration information, and radio link control (RLC) entity configuration information; or
when the PDCP entity corresponding to the second connection and the PDCP entity corresponding to the first connection are different PDCP entities, the configuration information of the second connection comprises: PHY entity configuration information, MAC entity configuration information, RLC entity configuration information, and PDCP entity configuration information.

* * * * *